United States Patent
Lee et al.

(10) Patent No.: US 8,433,444 B2
(45) Date of Patent: Apr. 30, 2013

(54) MIRROR AND ADJUSTMENT METHOD THEREFOR

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 386 days.

(21) Appl. No.: 12/823,146

(22) Filed: Jun. 25, 2010

(65) Prior Publication Data

US 2011/0238218 A1    Sep. 29, 2011

(30) Foreign Application Priority Data

Mar. 26, 2010    (TW) ............................... 99109269 A

(51) Int. Cl.
*G05D 3/20* (2006.01)
*G03B 15/00* (2006.01)

(52) U.S. Cl.
USPC ............................................. 700/275; 396/2

(58) Field of Classification Search .................. 700/275; 382/255; 396/2; 348/222.1, 333.11
See application file for complete search history.

(56) References Cited

U.S. PATENT DOCUMENTS

| | | | | |
|---|---|---|---|---|
| 1,794,142 A | * | 2/1931 | Boston | 396/376 |
| 4,771,300 A | * | 9/1988 | Bryan | 396/428 |
| D312,829 S | * | 12/1990 | Kuroki | D16/214 |
| 5,993,015 A | * | 11/1999 | Fredricks | 359/843 |
| 6,049,674 A | * | 4/2000 | Yamamoto et al. | 396/2 |
| 6,501,536 B1 | * | 12/2002 | Fredricks | 356/3.01 |
| 7,088,386 B2 | * | 8/2006 | Goto | 348/77 |
| 7,116,803 B2 | * | 10/2006 | Lemelson et al. | 382/118 |
| 7,184,606 B2 | * | 2/2007 | Shindo et al. | 382/255 |
| 7,272,267 B1 | * | 9/2007 | Nakajima | 382/294 |
| 7,848,545 B2 | * | 12/2010 | Kameyama | 382/118 |
| 8,098,293 B2 | * | 1/2012 | Nakanishi et al. | 348/222.1 |
| 2010/0295782 A1 | * | 11/2010 | Binder | 345/158 |
| 2011/0155119 A1 | * | 6/2011 | Hickerson et al. | 126/574 |
| 2011/0216235 A1 | * | 9/2011 | Waite | 348/333.11 |

* cited by examiner

*Primary Examiner* — Dave Robertson
(74) *Attorney, Agent, or Firm* — Altis Law Group, Inc.

(57) ABSTRACT

A method for adjusting a mirror. The method includes using a camera to capture an image of an object, locating a suitable region in the image, obtaining a first midline between a reference line in the suitable region and a top of the object in the suitable region, obtaining a second midline of the image, comparing the first and second midlines to determine whether the two midlines overlap, outputting a comparison signal upon the condition that the two midlines do not overlap, and directing a driving apparatus to move the mirror to adjust a height of the mirror according to the comparison signal.

7 Claims, 9 Drawing Sheets

MIRROR AND ADJUSTMENT METHOD THEREFOR

BACKGROUND

1. Technical Field

The present disclosure relates to a mirror and an adjustment method for the mirror.

2. Description of Related Art

Most mirrors are of fixed size. When looking into a full or half length mirror, people of different heights may need to bend or stand on a support to see the part of themselves that they want to see in the mirror. If the mirror is not fixed to a wall, the height of the mirror may be adjusted. Adjustments may depend on whether the mirror is full or half length. However, this is an inconvenience. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
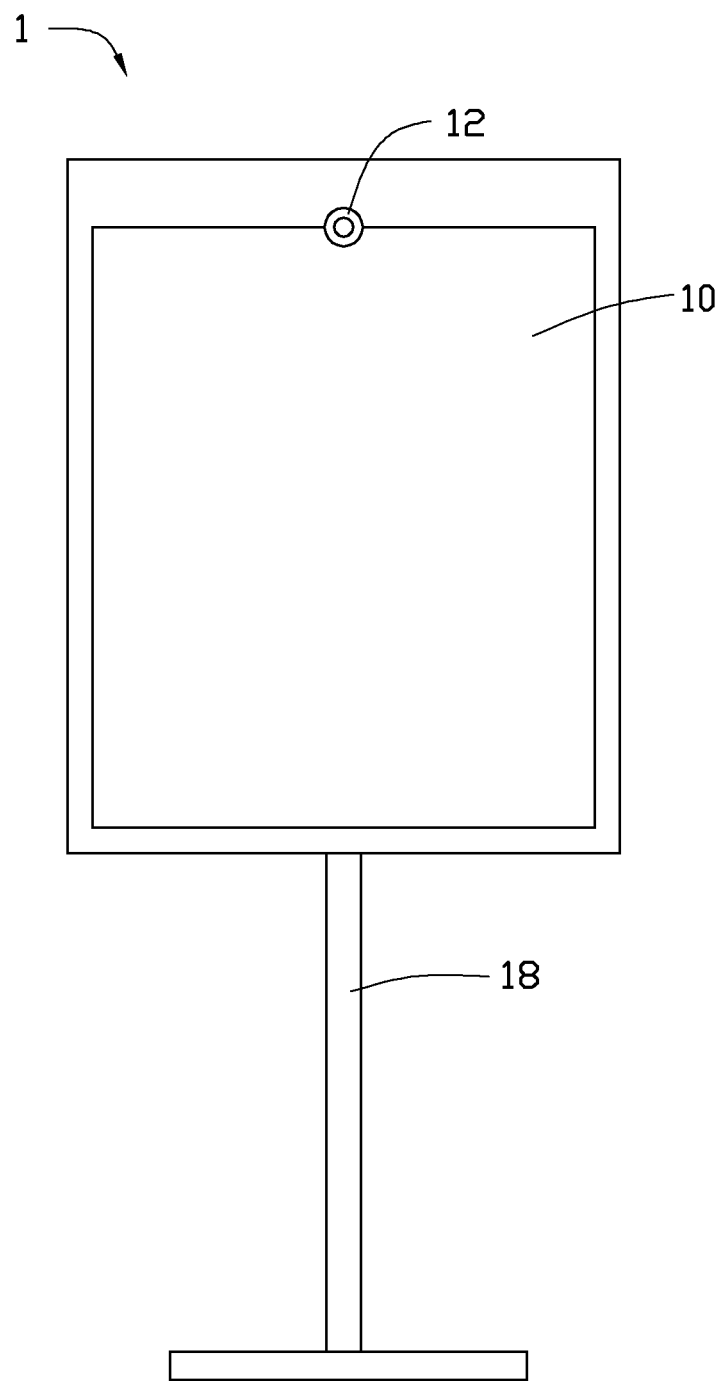
FIG. 1 is a schematic diagram of an exemplary embodiment of a mirror with a driving apparatus.
Figure 2:
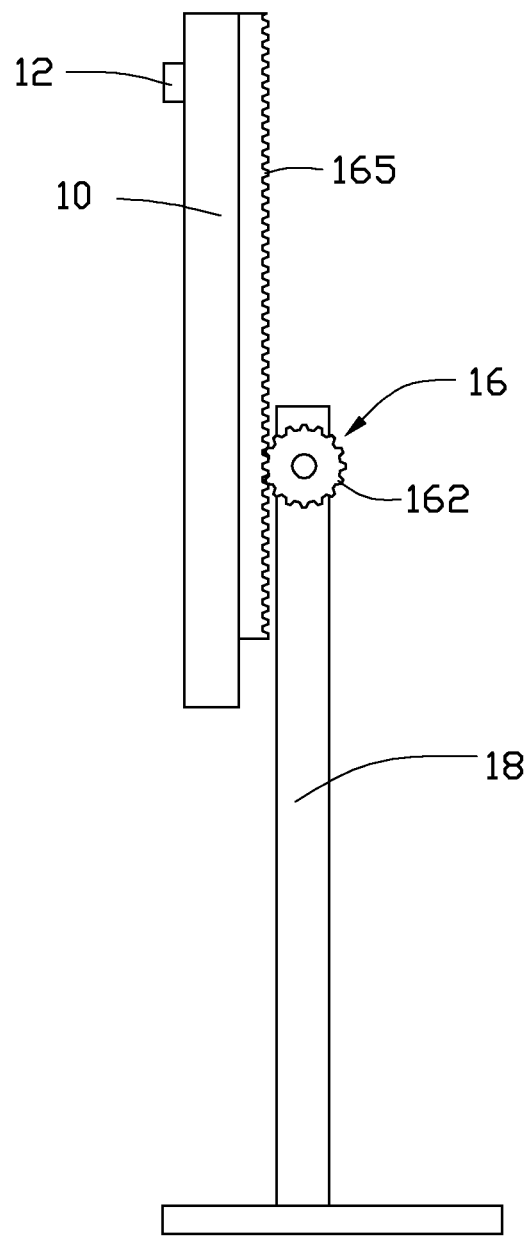
FIG. 2 is another schematic diagram of the mirror.
Figure 3:
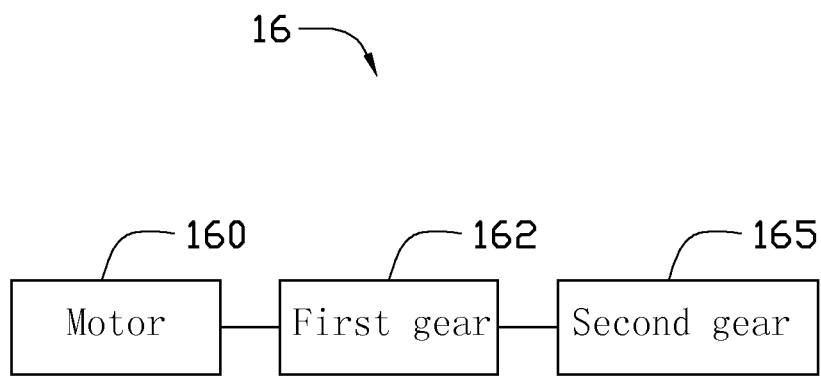
FIG. 3 is a block diagram of the driving apparatus of FIG. 1.
Figure 4:
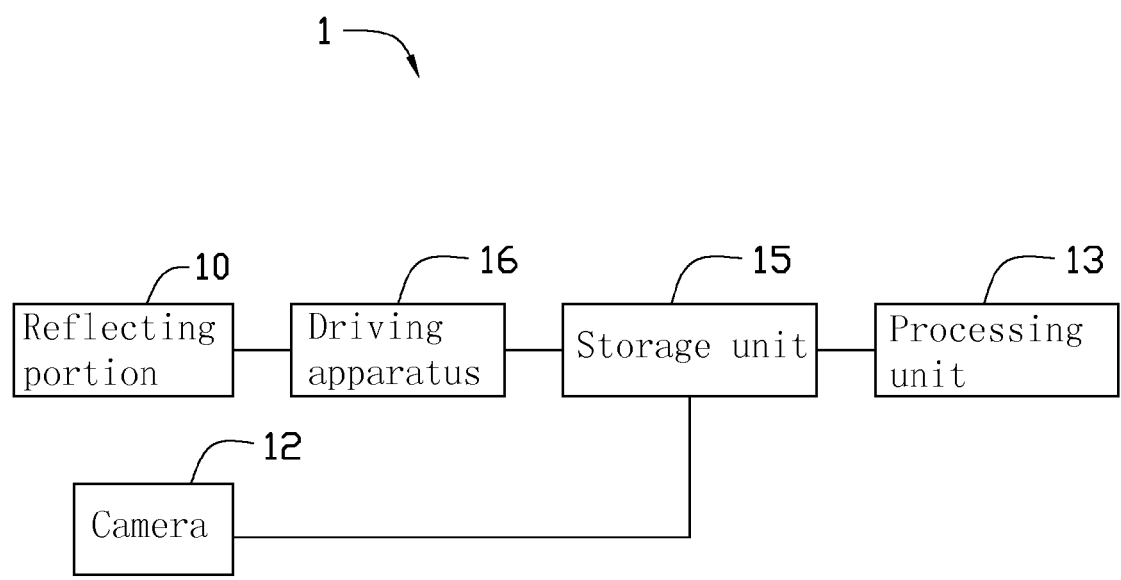
FIG. 4 is a block diagram of the mirror of FIG. 1 with a storage unit.

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

While the following description details a method for adjusting a mirror to allow viewing of the top of a reflected object when the mirror is shorter than the object, adjustment of the mirror to allow viewing of the bottom of the reflected object involves similar methodology.

Referring to FIGS. 1 to 4, an exemplary embodiment of a mirror 1 includes a reflecting portion 10, a camera 12, a storage unit 15, a processing unit 13, a driving apparatus 16, and a stand 18. A height of the mirror 1 can be adjusted according to a height of a reflected object.

The reflecting portion 10 is for reflecting an image of a reflected object in front of the reflecting portion 10. The camera 12 is mounted on a top of the reflecting portion 10, with a center of a lens of the camera 12 aligns with the top edge of the reflecting portion 10. The processing unit 13 and the storage unit 15 process the image from the camera 12 to determine a midline between a reference line of the object in the image and a top of the object in the image, and a midline of the image. The processing unit 13 and the storage unit 15 further adjust the height of the reflecting portion 10 by the driving apparatus 16 to overlap the two midlines. As a result, the location of the top edge of the reflecting portion 10 is on a level with the midline between the reference line and the top of the object. A full image of the top of the object is visible in the reflecting portion 10.

In the embodiment, the driving apparatus 16 includes a motor 160, a first gear 162, and a second gear 165. The first gear 162 is mounted on the stand 18, and is a wheel gear. The second gear 165 is mounted on a back of the reflecting portion 10, and is a toothed track. The motor 160 rotates the first gear 162 to change the height of the reflecting portion 10.

Figure 5:
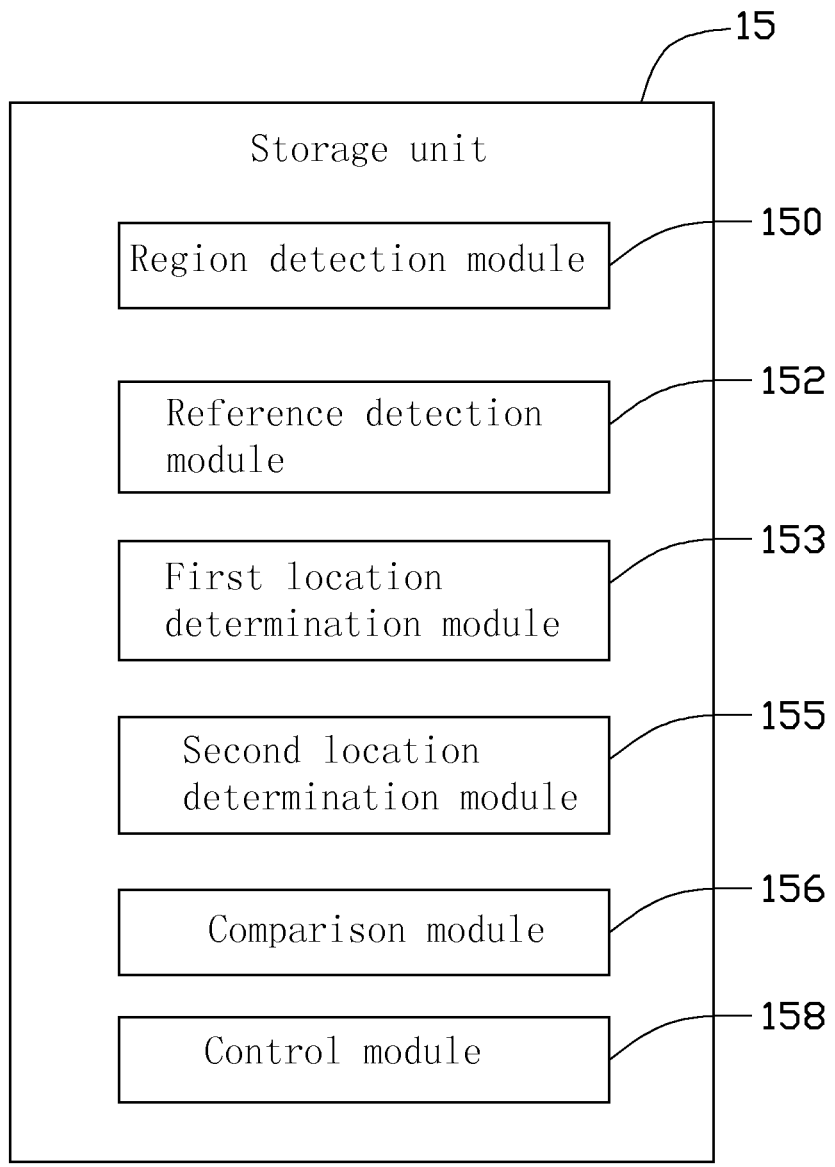
FIG. 5 is a block diagram of the storage unit of FIG. 4.

Referring to FIG. 5, the storage system 15 includes a region detection module 150, a reference detection module 152, a first location determination module 153, a second location determination module 155, a comparison module 156, and a control module 158, which may include one or more computerized instructions executed by the processing unit 13.

The region detection module 150 locates a suitable region in the image from the camera 12, using known feature recognition technology.

The reference detection module 152 detects a reference line in the suitable region of the image, again using known recognition technology. In some embodiments, the reference detection module 152 can be omitted, whereby the region detection module 150 regards a top one-third of the suitable region as the reference line.

The first location determination module 153 obtains a midline between the reference line and a top of the object in the image. In the embodiment, the top of the object in the image may be regarded as a top of the suitable region in the image. The second location determination module 155 obtains a midline of the image.

The comparison module 156 compares the two midlines, and outputs a corresponding comparison signal to the control module 158. The control module 158 directs the driving apparatus 16 to adjust the height of the reflecting portion 10.

Figure 6:
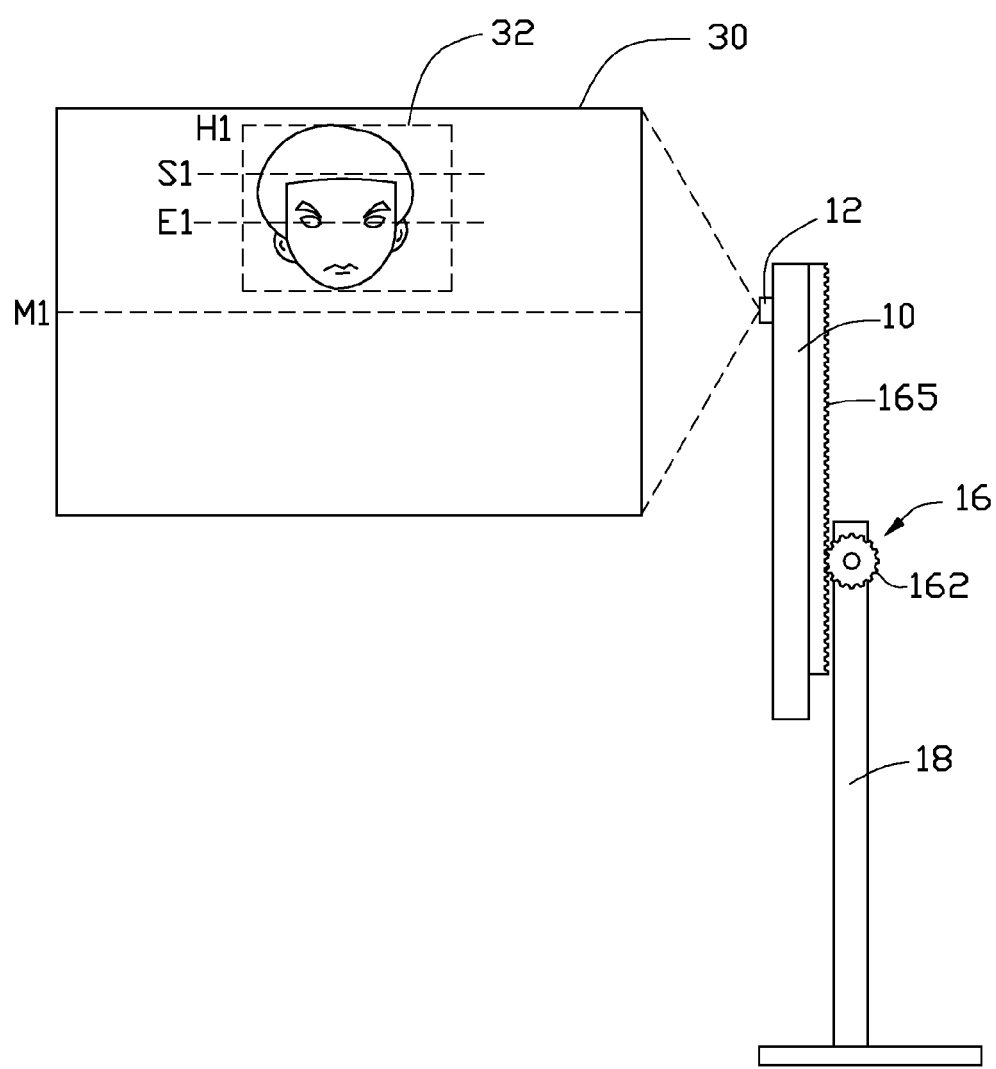
FIGS. 6 and 7 are schematic views showing adjustment of the mirror of FIG. 1.

Referring to FIG. 6, the camera 12 captures the object to obtain an image 30. A midline of the image 30 is on a level with the camera 12.

The region detection module 150 analyses the image 30 to locate a suitable region 32 in the image 30. In the image 30, other portions are cropped. The reference detection module 152 analyses the suitable region 32 to locate the reference line E1 in the suitable region 32. A top of the object in the image 30 is marked as a broken line H1. As a result, the first location determination module 153 obtains a midline S1 between the broken lines E1 and H1. In FIG. 6, the suitable region 32 is a face region of a person, the reference line E1 is a reference eyeline of the person, and the broken line H1 represents a top of the person.

The second location determination module 155 obtains the midline M1 of the image 30. The comparison module 156 compares the two midlines S1 and M1, and, in the event of a misalignment therebetween, outputs a corresponding comparison signal to the control module 158.

The control module 158 directs the driving apparatus 16 to move the reflecting portion 10 up a distance. Conversely, if the middle line S1 between the reference line E1 in the image and the location of the top of the object in the image is lower than the midline of the image, the control module 158 directs the driving apparatus 16 to move the reflecting portion 10 down a distance. Such adjustments are repeated, referring to FIG. 7, to overlap the two midlines M1 and S1, after completion of which, control module 158 stops the driving apparatus 16.

Figure 7:
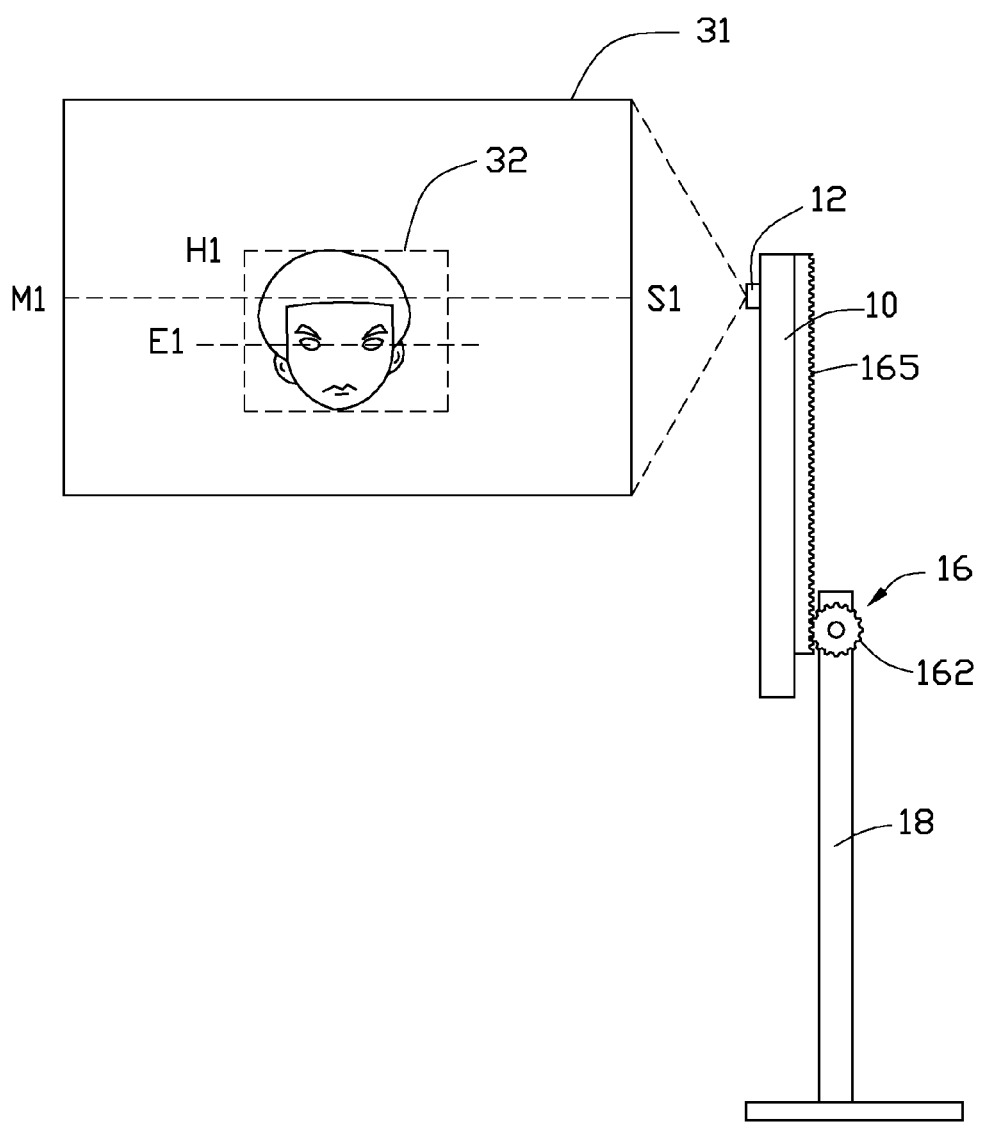
Figure 8:
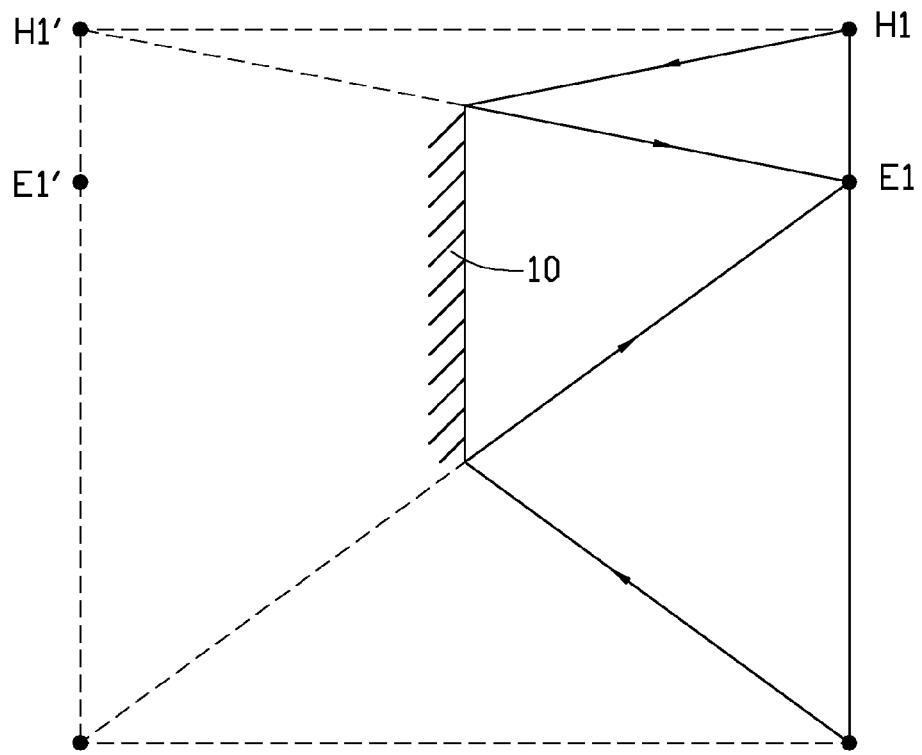
FIG. 8 is a schematic diagram of a reflected object in front of a mirror.

The midline M1 of the image 30 is aligned with the camera 12, and the camera 12 is mounted on the top edge of the reflecting portion 10, such that the top edge of the reflecting portion 10 is aligned with the midline M1 of the image 30. In FIG. 7, the two midlines M1 and S1 overlapping denotes that the location of the top edge of the reflecting portion 10 is overlapped with the midline between the reference line and the top of the object. As a result, as shown in FIG. 8, the top of the object is visible in the reflecting portion 10.

Figure 9:
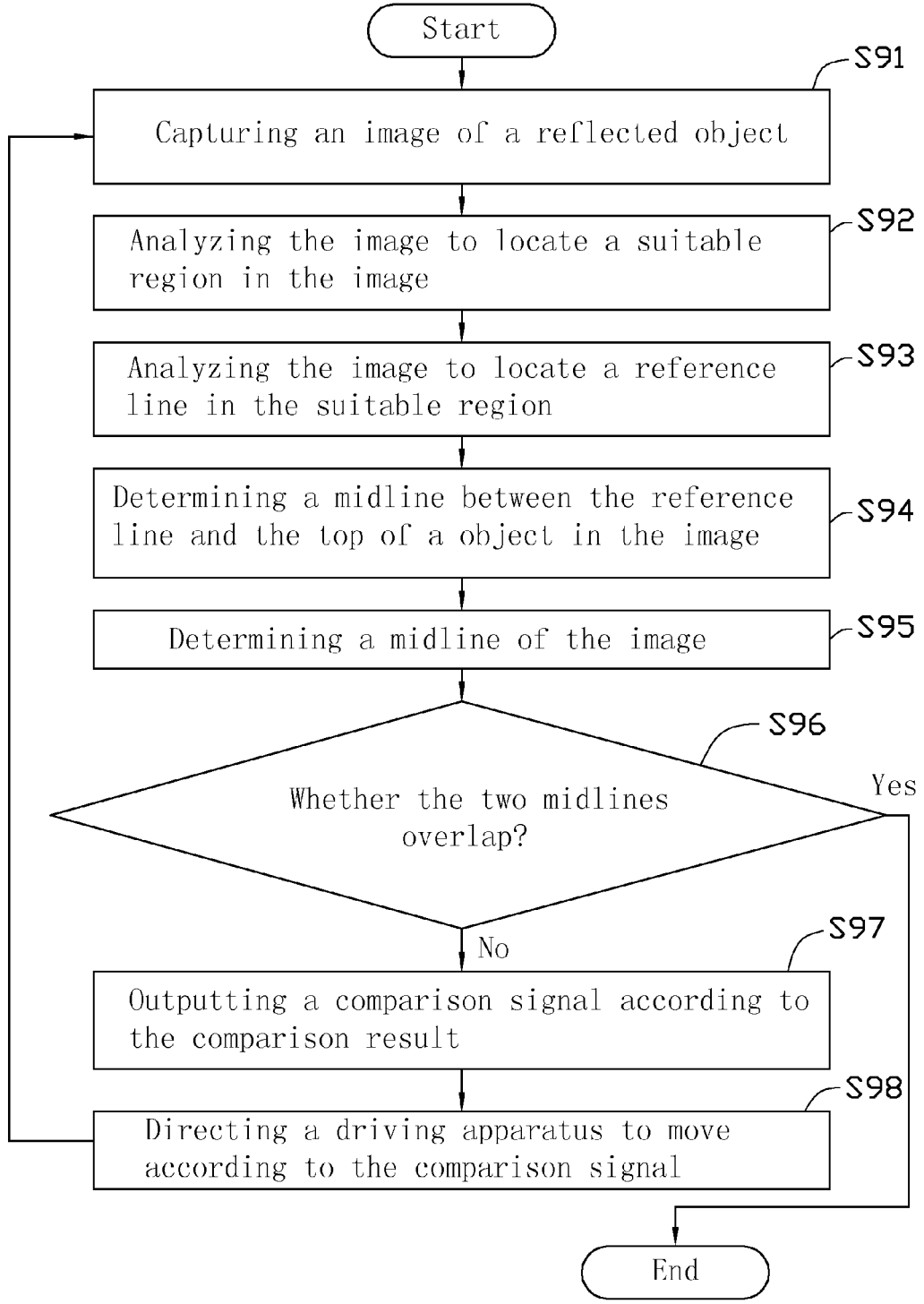
FIG. 9 is a flowchart of an exemplary embodiment of an adjustment method for a mirror.

FIG. 9 shows an adjustment method for the mirror 1 as follows.

In step S91, a camera 12 captures an image of a reflected object.

In step S92, a region detection module 150 analyzes the image to locate a suitable region in the image.

In step S93, a reference detection module 152 analyzes the image to locate a reference line in the suitable region.

In step S94, a first location determination module 153 determines the midline S1 between the reference line E1 and the top of the object H1 in the image.

In step S95, a second location determination module 155 determines the midline M1 of the image.

In step S96, a comparison module 156 compares the two midlines S1 and M1 to determine whether the two midlines S1 and M1 overlap. Upon the condition that the two midlines S1 and M1 overlap, the top of the object is visible in the reflecting portion 10 and the process ends. Upon the condition that the two midlines S1 and M1 do not overlap, step S97 is implemented.

In step S97, the comparison module 156 outputs a comparison signal according to the comparison result.

In step S98, the control module 158 directs the driving apparatus 16 to move according to the comparison signal, and step S91 is repeated.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A mirror comprising:
   a reflecting portion mounted to a stand;
   a camera, a center of a lens of which aligns with a top edge of the reflecting portion, wherein the camera captures an image of a person directly, without through reflection of the reflecting portion;
   a driving apparatus to adjust a location of the reflecting portion on the stand, for changing a height of the mirror;
   a processing unit; and
   a storage unit connected to the processing unit, the camera, and the driving apparatus, and storing a plurality of programs to be executed by the processing unit, wherein the storage unit comprises:
   a region detection module analyzing the image to locate a face region therein;
   a first location determination module to obtain a first midline between a reference line in the face region and a top edge of the face region;
   a second location determination module to obtain a second midline of the image;
   a comparison module to compare the first and second midlines to determine whether the first and second midlines overlap, and output a comparison signal upon the condition that the first and second midlines do not overlap; and
   a control module directing the driving apparatus to move the reflecting portion relative to the stand according to the comparison signal.

2. The mirror of claim 1, wherein a top one-third of the face region is regarded as the reference line.

3. The mirror of claim 1, wherein the storage unit further comprises a reference detection module, analyzing the image to locate the reference line in the face region.

4. The mirror of claim 1, wherein the driving apparatus comprises a motor, a first gear, and a toothed track, the first gear mounted on the stand and the toothed track mounted on a back of the mirror portion, whereby the motor rotates the first gear to rotate to change the height of the mirror portion.

5. An adjustment method for a mirror, the adjustment method comprising:
   capturing an image of a person directly by a camera mounted on the mirror, the lens center of which aligns with the top edge of the mirror;
   analyzing the image to locate a face region in the image;
   obtaining a first midline between a reference line in the face region and a top edge of the face region;
   obtaining a second midline of the image;
   comparing the first and second midlines to determine whether the first and second midlines overlap, and outputting a comparison signal when the first and second midlines do not overlap; and
   directing a driving apparatus to move the mirror to adjust a height of the mirror, according to the comparison signal.

6. The adjustment method of claim 5, wherein a top one-third of the face region is regarded as the reference line.

7. The adjustment method of claim 5, further comprising, between analyzing the image to locate the face region in the image and obtaining the first midline between the reference line in the face region and a top of the object in the face region, analyzing the image to locate a reference line in the face region.

* * * * *